United States Patent
Kushibe et al.

(10) Patent No.: US 7,333,722 B2
(45) Date of Patent: Feb. 19, 2008

(54) DISC PLAYBACK APPARATUS WITH DISPLAY OF KEY IMAGES

(75) Inventors: Masanori Kushibe, Iwaki (JP); Keizo Suzuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1102 days.

(21) Appl. No.: 10/238,018

(22) Filed: Sep. 9, 2002

(65) Prior Publication Data
US 2003/0068157 A1  Apr. 10, 2003

(30) Foreign Application Priority Data
Sep. 26, 2001  (JP) ............................. 2001-293287

(51) Int. Cl.
  H04N 5/00  (2006.01)
  H04N 5/76  (2006.01)
  H04N 7/00  (2006.01)
(52) U.S. Cl. ....................................... 386/126; 386/106
(58) Field of Classification Search .................. 386/45, 386/125, 126, 69, 70
See application file for complete search history.

(56) References Cited

U.S. PATENT DOCUMENTS

| 4,675,755 A | 6/1987 | Baumeister et al. |
| 5,461,596 A | 10/1995 | Barrett |
| 5,701,385 A * | 12/1997 | Katsuyama et al. ........ 386/106 |
| 6,243,328 B1 * | 6/2001 | Fenner et al. ............ 707/104.1 |
| 6,347,114 B1 | 2/2002 | Blanchard |
| 6,700,049 B2 * | 3/2004 | Togashi ....................... 84/609 |
| 2005/0232590 A1 * | 10/2005 | Shimizu ...................... 386/69 |

* cited by examiner

Primary Examiner—Thai Q. Tran
Assistant Examiner—Gelek Topgyal
(74) Attorney, Agent, or Firm—Brinks Hofer Gilson & Lione

(57) ABSTRACT

In a disc playback apparatus in which a plurality of digital versatile discs (DVDs) are loaded in a disc changer, a key-image extracting unit causes menu screens recorded on the plurality of loaded DVDs to be decoded, and generates predetermined key-image data by reducing video data of the menu screens decoded by a video decoder. The key-image extracting unit stores the generated key-image data in a hard disk device. An index-screen generating unit reads the key-image data stored in the hard disk device to generate and display a predetermined index screen including key images produced using the key-image data. The disc playback apparatus allows a user to readily grasp the content of the DVDs loaded therein.

15 Claims, 7 Drawing Sheets

DISC PLAYBACK APPARATUS WITH DISPLAY OF KEY IMAGES

BACKGROUND OF THE INVENTION

1. Field of the Invention

The present invention relates to a disc playback apparatus in which a plurality of digital versatile discs (DVDs) can be loaded for playing back video etc. recorded on the DVDs.

2. Description of the Related Art

As is known in the art, a changer-equipped disc playback apparatus selects a disc specified by a user from a plurality of discs loaded in a disc changing mechanism, and plays back information recorded on the disc. For instance, disc playback apparatuses in which a plurality of compact discs (CDs) are loaded for playing back music recorded on any of the CDs have been widely used. Recently, disc playback apparatuses in which a plurality of digital versatile discs (DVDs) are loaded for playing back video and audio, such as movies and the like, recorded on any of the DVDs have become widespread.

In the above-described changer-equipped disc playback apparatuses, disc numbers may be allocated to discs according to their respective stored positions, and the disc number of a desired disc is specified in order to play back information recorded on the desired disc. However, since it is difficult for most users to remember the stored content and the stored position of all the loaded discs, the discs must be played back to confirm the content thereof in order to specify the desired disc.

When playing back a DVD having video or the like recorded thereon, it takes some time until the content is displayed after one DVD has been specified. The above-described process for playing back each disc to confirm the content thereof requires a long time until a desired DVD is found. In addition, this process is complicated and inconvenient to users. Accordingly, there have been demands for a disc playback apparatus which allows a user to readily grasp the contents of a plurality of DVDs loaded therein.

SUMMARY OF THE INVENTION

The present invention has been devised in view of such a background, and it is an object of the present invention to provide a disc playback apparatus which allows a user to readily grasp the contents of a plurality of DVDs loaded therein.

To this end, the present invention provides a disc playback apparatus in which a plurality of digital versatile discs (DVDs) each having video recorded thereon are loaded in a disc changing mechanism. The disc changing mechanism selects any of the loaded DVDs to set the selected DVD at a playback position, and the DVD set at the playback position by the disc changing mechanism is played back by a playback unit. A key-image extracting unit causes the playback unit to sequentially play back the plurality of DVDs loaded in the disc changing mechanism, and extracts a key image related to the content recorded on each of the DVDs. An index-screen generating and displaying unit generates and displays an index screen including the key images for the plurality of DVDs within one screen. Therefore, key images related to the content recorded on a plurality of DVDs loaded in a disc changing mechanism can be extracted to generate and display an index screen, thus allowing a user to readily grasp the content of the DVDs.

Preferably, the key image comprises a thumbnail image obtained by reducing a menu screen of each of the DVDs, or any thumbnail image contained in a chapter menu of each of the DVDs. Most DVDs have menu screens for playback settings recorded thereon, including the presence or absence of a caption. Since a menu screen contains information about the recorded content, such as the movie title and pictures of the cast, the menu screen is reduced to easily generate a key image. A chapter menu contains some thumbnail images representative of, for example, key scenes in a movie program, thus making it easy to generate key images using such thumbnail images.

Preferably, the disc playback apparatus further includes a storage device for storing key-image data corresponding to the key images extracted by the key-image extracting unit, and the index-screen generating and displaying unit generates the index screen by reading and editing the key-image data stored in the storage device. The key-image data stored in the storage device makes it easy to save or modify the extracted key images for the DVDs and to generate an index screen.

Preferably, the disc playback apparatus further includes a played-disc determining unit for specifying any of the key images included in the index screen to determine a DVD to be played back; and a playback control unit for, when any of the DVDs is determined by the played-disc determining unit, sending to the disc changing mechanism an operating instruction to set the DVD at the playback position, and for instructing a playback operation to the playback unit. Therefore, users need only select any key image while viewing the index screen in order to determine the DVD to be played back, which is simple, thus improving the ease of use.

Preferably, the index-screen generating and displaying unit displays, as a candidate, the key image specified by the played-disc determining unit in a different fashion than the other key images, and an audio output unit plays back and provides a sound output corresponding to the candidate key image. The sound corresponding to the candidate key image can be produced, thus allowing a user to more readily grasp the recorded content of the DVD. Some sound is produced while the index screen is being displayed, thereby further entertaining users with the audibly presented index screen.

If a compact disc (CD) can be loaded in the disc changing mechanism in addition to the DVDs, the disc playback apparatus preferably further includes a disc determining unit for determining the type of discs loaded in the disc changing mechanism, and a communication unit for, when the disc whose type is determined by the disc determining unit is a CD, obtaining a key image related to the CD via a predetermined communication line based on content table information contained in the CD, such that an index screen including the key image for the CD is generated and displayed by the index-screen generating and displaying unit.

A CD having pieces of music or the like recorded thereon is provided with a cover (so-called jacket) including a key illustration or photo relating to the content of the recorded pieces. Recently, an image (key image) for the jacket can be downloaded from a web site on the Internet via a communication line. Therefore, key images for CDs can be obtained and used to display an index screen including the key images indicating the content recorded on the CDs even if both DVDs and CDs are loaded.

If a CD can be loaded in the disc changing mechanism in addition to the DVDs, the disc playback apparatus preferably further includes a disc determining unit for determining the type of discs loaded in the disc changing mechanism, such that, when the disc whose type is determined by the disc determining unit is a CD and video is not recorded on the CD, a content display image including text information recorded on the CD is generated and contained in an index screen by the index-screen generating and displaying unit. Text information recorded on a CD can be used to generate a content display image which is contained in an index screen, thereby enabling a key image related to the recorded content of the compact disc to be displayed even when video is not recorded on the CD.

According to the present invention, therefore, key images related to the content recorded on a plurality of discs loaded in a disc changing mechanism are extracted. The extracted key images can be used to generate and display an index screen, thus allowing a user to readily grasp the content of the discs.

DESCRIPTION OF THE PREFERRED EMBODIMENTS

A disc playback apparatus according to an embodiment of the present invention is now described with reference to the drawings.

Figure 1:
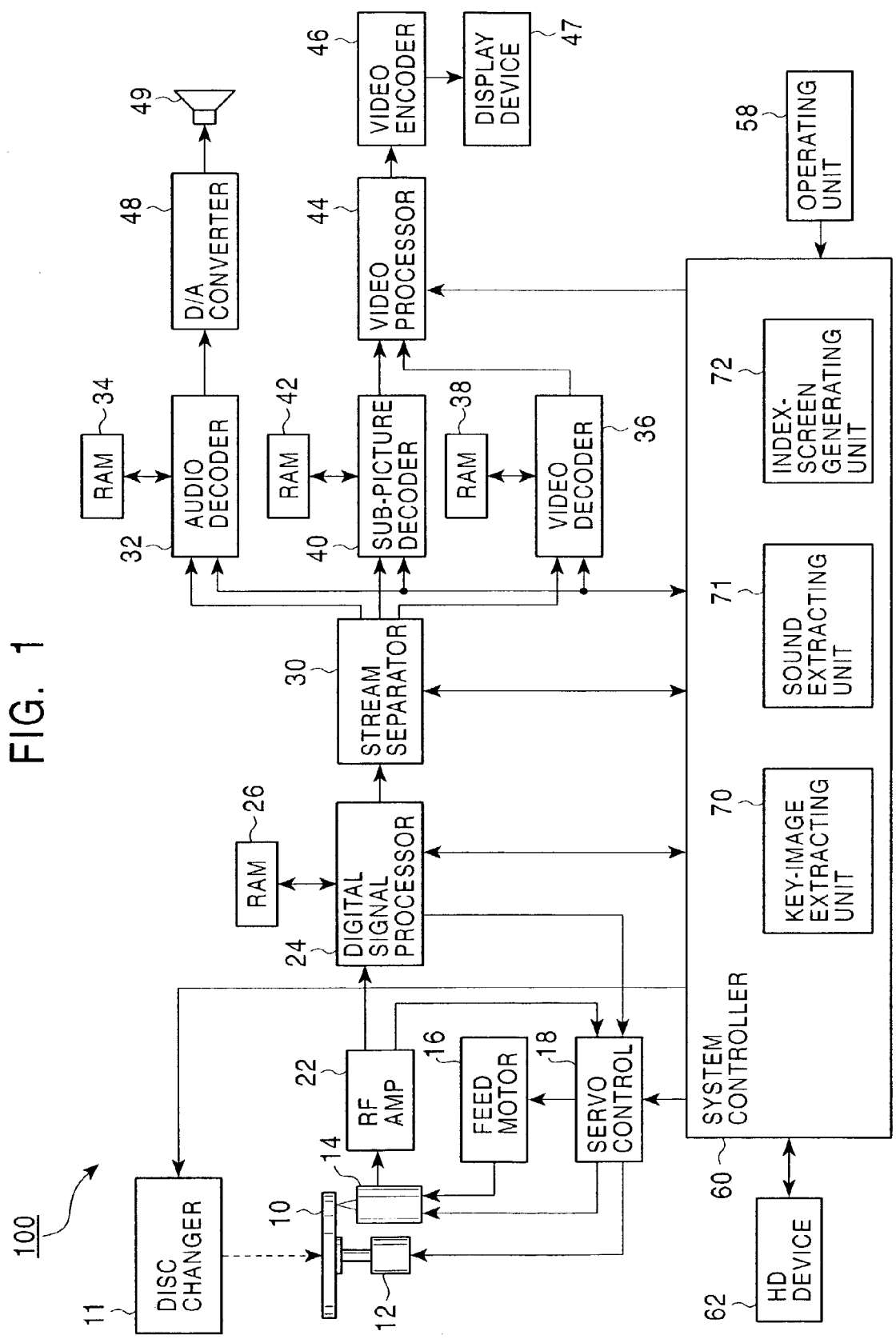
FIG. 1 is a block diagram of a disc playback apparatus according to an embodiment of the present invention.

FIG. 1 is a block diagram of a disc playback apparatus 100 according to an embodiment of the present invention. The disc playback apparatus 100 shown in FIG. 1 includes a disc changer 11, a spindle motor 12, an optical pickup 14, a feed motor 16, a servo control unit 18, an RF amplifier 22, a digital signal processing unit 24, four buffer RAMs 26, 34, 38, and 42, a stream separation unit 30, an audio decoder 32, a video decoder 36, a sub-picture decoder 40, a video processor 44, a video encoder 46, a display device 47, a digital-to-analog (D/A) converter 48, a speaker 49, an operating unit 58, a system controller 60, and a hard disk (HD) device 62.

The disc changer 11 is capable of receiving a plurality of DVDs 10, and has a mechanism for setting one DVD 10 to be played back at a playback position, namely, at the spindle motor 12, under the control of the system controller 60.

The spindle motor 12 causes the DVD 10 to rotate at a predetermined rate. The optical pickup 14 detects data recorded on the DVD 10, and may contain a semiconductor laser and a photodiode. The feed motor 16 causes the optical pickup 14 to move in the radial direction of the DVD 10.

In response to an instruction from the system controller 60, the servo control unit 18 drives the spindle motor 12 and the feed motor 16, and moves an internal objective lens (not shown) of the optical pickup 14, thereby causing the focus position of the semiconductor laser to move in the horizontal and vertical directions of the recording surface of the DVD 10. The servo control unit 18 further performs various kinds of servo control necessary for reading data from the DVD 10, such as focus servo control, tracking servo control, and rotation servo control.

The RF amplifier 22 amplifies an electrical signal supplied from the photodiode contained in the optical pickup 14. The digital signal processing unit 24 converts the signal from the RF amplifier 22 into digital data before performing a signal demodulating process (8/16 demodulation) according to the data format of the DVD 10 and error correction. The digital signal processing unit 24 then stores the resulting signal in the RAM 26. In response to an instruction from the system controller 60, the digital signal processing unit 24 both extracts control data to provide to the system controller 60 and extracts video playback data, etc., to provide to the stream separation unit 30.

In response to an instruction from the system controller 60, the stream separation unit 30 breaks the data from the digital signal processing unit 24 into playback control data, audio playback data, video playback data, and sub-picture playback data, and distributes the data to the appropriate decoders and the system controller 60.

The audio decoder 32 appropriately decodes the audio playback data supplied by the stream separation unit 30, and produces audio data. The video decoder 36 appropriately decodes the video playback data supplied by the stream separation unit 30, and produces video data. The sub-picture decoder 40 appropriately decodes the sub-picture playback data supplied by the stream separation unit 30, and produces sub-picture data.

In response to an instruction from the system controller 60, the video processor 44 combines the video data supplied by the video decoder 36 with the sub-picture data supplied by the sub-picture data decoder 40 to generate image data, and provides the image data to the video encoder 46.

The video encoder 46 converts the image data from the video processor 44 into an image signal for display. The resulting image signal is supplied to the display device 47, where an image is displayed.

The D/A converter 48 converts the audio data supplied by the audio decoder 32 into an analog audio signal. The resulting audio signal is supplied to the speaker 49, where a sound output is played back.

The operating unit 58 is provided with various operation keys, including a playback key, a stop key, a pause key, an up-down-left-right cursor key, and an enter key for selecting an item identified by a cursor on the display screen. A signal according to a key operation is supplied to the system controller 60.

The system controller 60 performs the overall control of the functional blocks. Examples include providing various servo instructions to the servo control unit 18, and providing to the video processor 44 an instruction to generate an image according to an instruction from a user. More specifically, the system controller 60 receives the control data contained in the data received from the digital signal processing unit 24, and the control data received from the stream separation unit 30 to execute navigation commands contained therein, thus allowing various types of control including providing various servo instructions to the servo control unit 18 and providing to the video processor 44 an instruction to generate an image according to an instruction from the user.

The system controller 60 includes a key-image extracting unit 70, a sound extracting unit 71, and an index-screen generating unit 72.

The key-image extracting unit 70 extracts key images indicating the content recorded on the plurality of DVDs 10 loaded in the disc changer 11 to generate key-image data, and stores the data in the hard disk device 62. More specifically, the key-image extracting unit 70 extracts and reduces a menu screen (a screen for audio or subtitle settings or for selecting a title to be played back) recorded on each DVD 10 to generate a key image. The menu screen contains information about the recorded content, such as the movie title and pictures of the cast. The menu screen is reduced to easily generate a key image.

The sound extracting unit 71 extracts a sound corresponding to the key image extracted by the key-image extracting unit 70 to generate sound data, and stores the data in the hard disk device 62. In this embodiment, audio recorded on the DVD 10 is extracted to be played back together with the menu screen. When one of the key images contained in an index screen generated by the index-screen generating unit 72 is temporarily selected (as described in detail below), the sound extracting unit 71 reads the sound data corresponding to that key image, and sends it to the audio decoder 32 in order to play back the sound.

The index-screen generating unit 72 uses the key-image data stored in the hard disk device 62 to generate a predetermined index screen indicating the content of the DVDs 10 loaded in the disc changer 11.

The index-screen generating unit 72 highlights one of the key images contained in the index screen, and switches the highlighted key image in response to an instruction from the operating unit 58. The index screen generated by the index-screen generating unit 72 is sent to the video processor 44, and is appropriately processed by the video processor 44 and the video encoder 46. After the appropriate processing, the index screen is displayed on the display device 47.

The hard disk device 62 incorporates an internal hard disk as a storage medium for storing the key-image data, etc., provided by the system controller 60. The key-image data stored in the hard disk device 62 makes it easy to save or modify the extracted key images for the DVDs 10 and to generate an index screen.

The disc changer 11 serves as a disc changing mechanism. The spindle motor 12, the optical pickup 14, the feed motor 16, the servo control unit 18, the RF amplifier 22, the digital signal processing unit 24, the four buffer RAMs 26, 34, 38, and 42, the stream separation unit 30, the audio decoder 32, the video decoder 36, the sub-picture decoder 40, and the digital-to-analog (D/A) converter 48 serve as a playback unit. The key-image extracting unit 70 serves as a key-image extracting unit. The video processor 44, the video encoder 46, the display device 47, and the index-screen generating unit 72 serve as an index-screen generating and display unit. The operating unit 58 serves as a played-disc determining unit, and the system controller 60 serves as a playback control unit. The audio decoder 32, the D/A converter 48, the speaker 49, and the sound extracting unit 71 serve as an audio output unit. The hard disk device 62 serves as a storage device.

The operation of the disc playback apparatus 100 in this embodiment will now be described.

Figure 2:
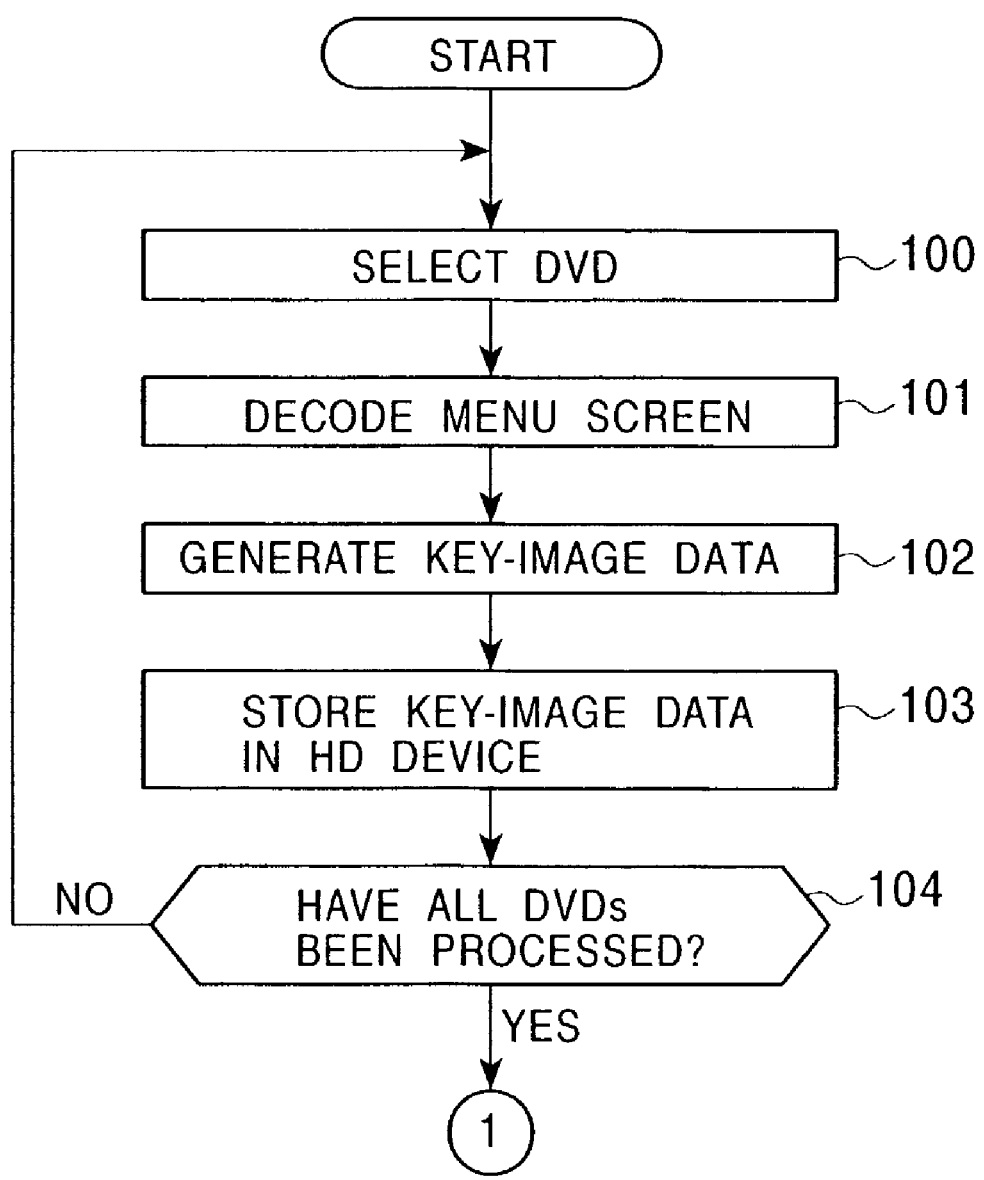
FIG. 2 is a flowchart showing an operating procedure for the disc playback apparatus to generate and display an index screen for a plurality of DVDs loaded therein.
Figure 3:
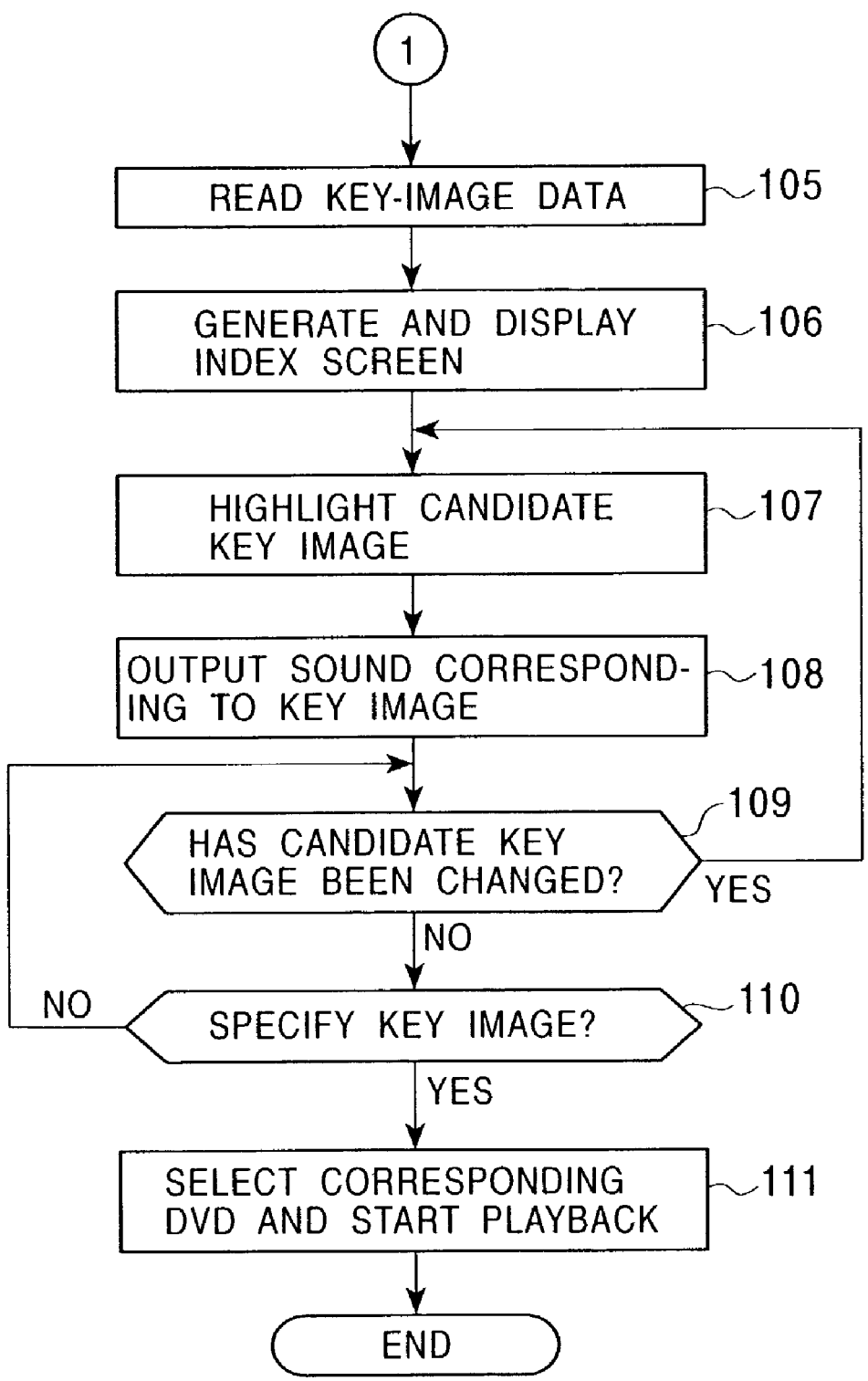
FIG. 3 is a flowchart showing an operating procedure for the disc playback apparatus to generate and display an index screen for a plurality of DVDs loaded therein.

FIGS. 2 and 3 are flowcharts showing an operating procedure for the disc playback apparatus 100 to generate and display an index screen for the plurality of DVDs 10 loaded therein.

The key-image extracting unit 70 in the system controller 60 selects one of the DVDs 10, and notifies the disc changer 11 of this selection (step 100). For example, one of the DVDs 10 may be selected according to the sequence in which the DVDs 10 are stored in the disc changer 11.

When the DVD 10 is set at the spindle motor 12 by the disc changer 11 upon the notification, the key-image extracting unit 70 causes the menu screen recorded on the DVD 10 to be decoded (step 101). More specifically, the components in the disc playback apparatus 100 operate in response to the notification from the key-image extracting unit 70, and data necessary to play back the menu screen is read from the DVD 10 and is then appropriately decoded by the video decoder 36.

The key-image extracting unit 70 then obtains video data for the menu screen decoded by the video decoder 36, and reduces the video data to generate key-image data (step 102). Subsequently, the key-image extracting unit 70 stores the generated key-image data in the hard disk device 62 (step 103).

The key-image extracting unit 70 determines whether or not a series of processes for decoding and reducing the menu screen to generate key-image data has been performed on all the DVDs loaded in the disc changer 11 (step 104). If all the loaded DVDs 10 have not been processed, a negative determination is made in step 104, and the key-image extracting unit 70 selects another one of the DVDs 10 in step 100. The procedure subsequent to step 100 is then repeated.

If all the loaded DVDs 10 have been processed, an affirmative determination is made in step 104, and the index-screen generating unit 72 in the system controller 60 reads the key-image data stored in the hard disk device 62 (step 105) to generate and display a predetermined index screen using the read key-image data (step 106). The index-screen generating unit 72 further highlights a candidate key image to be played back (step 107).

The sound extracting unit 71 plays back a sound corresponding to the highlighted key image (step 108). More specifically, the sound extracting unit 71 reads the necessary sound data from the hard disk device 62, and sends it to the audio decoder 36 in order to produce the sound corresponding to the key image.

Figure 4:
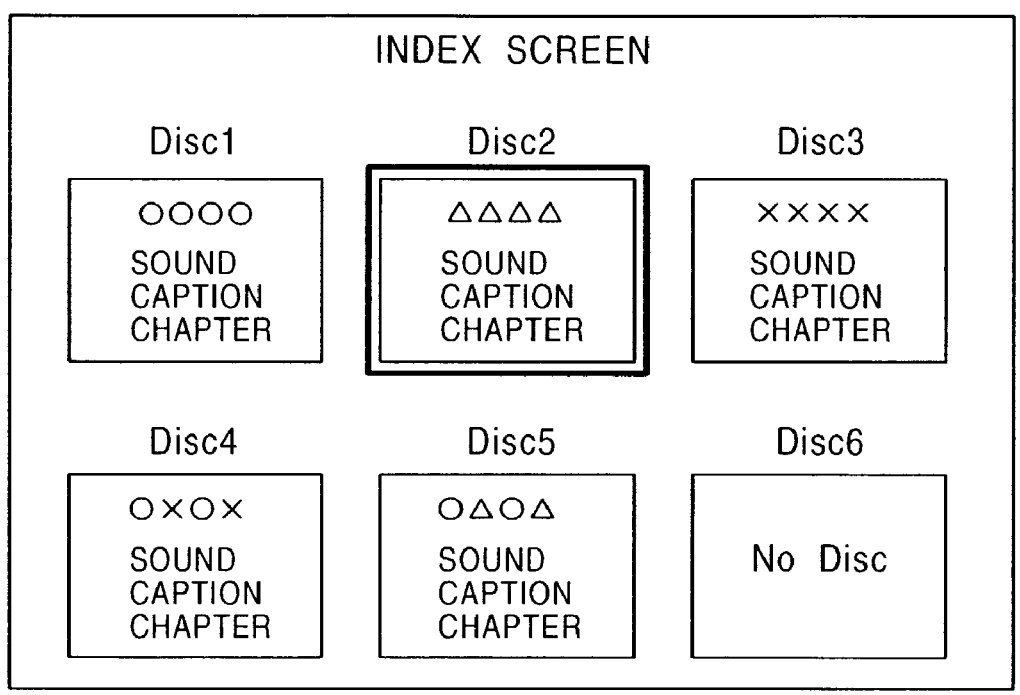
FIG. 4 illustrates an example display of an index screen.

FIG. 4 is a representation of an example display of an index screen. In the example display shown in FIG. 4, key images for five DVDs 10 loaded in the disc changer 11 are produced by reducing the respective menu screens. The texts "Disc 1" to "Disc 5", which stand for the positions in which the DVDs 10 are loaded in the disc changer 11, are shown above the respective key images. An image including the representation "No Disc" in place of a key image is shown below the text "Disc 6", which stands for the sixth position in the disc changer 11, indicating that a DVD 10 is not loaded in the sixth position in the disc changer 11. In the following description, "Disc n" indicates a DVD 10 loaded in the n-th position in the disc changer 11. For example, a DVD 10 loaded in the first position is indicated as "Disc 1". Accordingly, a menu screen including information about the pre-recorded content of a DVD 10, such as the movie title, is reduced to generate a key image, thereby making it easy to generate a key image without increasing the processing load.

In FIG. 4, the key image for "Disc 2" is highlighted distinctively from the other key images, indicating that this key image has been temporarily selected as the candidate DVD 10 to be played back. A predetermined sound corresponding to the candidate key image is played back and produced. In this way, a sound corresponding to a candidate key image is produced, thereby allowing a user to readily grasp the recorded content of the DVD 10. Some sound is produced while an index screen is being displayed, thereby further entertaining a user with the audibly presented index screen.

An operation using the operating unit 58 enables the candidate key image to be freely switched. Once a key image for a desired DVD 10 has been temporarily selected, a predetermined operation is performed (for example, the "enter key" provided on the operating unit 58 is pressed), thus allowing this key image to be specified, so that the corresponding DVD 10 can be played back. Therefore, the user need only select one of the key images while viewing an index screen in order to determine the DVD 10 to be played back, which is simple, thus improving the ease of use.

Thereafter, the index-screen generating unit 72 determines whether or not the candidate key image has been switched pursuant to an instruction given by the operating unit 58 (step 109). If the candidate key image has been switched, an affirmative determination is made, and the index-screen generating unit 72 highlights a new candidate key image in step 107. Then, the procedure subsequent to step 107 is repeated.

If an operating instruction to switch the candidate key image was not given, a negative determination is made in step 109, and the system controller 60 determines whether or not any key image contained in the index screen has been specified (step 110). If no key image has been specified, a negative determination is made, and the procedure returns to step 109 to repeat the subsequent processing.

If one of the key images has been specified, an affirmative determination is made in step 110, and the system controller 60 provides to the disc changer 11 an instruction identifying the DVD 10 corresponding to the specified key image to be played back. When the DVD 10 to be played back is set at the spindle motor 12 by the disc changer 11, the system controller 60 starts playing back the video, etc., recorded on the DVD 10 (step 111).

Accordingly, the disc playback apparatus 100 in this embodiment extracts key images related to the content recorded on a plurality of DVDs 10 loaded in the disc changer 11 to generate and display an index screen. This allows a user to readily grasp the content of the plurality of DVDs 10.

The present invention is not limited to this embodiment, and a variety of modifications may be made without departing from the scope and spirit of the invention. For example, in the above-described embodiment, a menu screen recorded on each of the DVDs 10 is used to generate a key image, thereby generating an index screen. However, any material other than the menu screen may be used to generate a key image. For instance, a thumbnail image contained in a chapter menu recorded on a DVD 10 may be used to generate a key image. As used herein, the term "chapter menu" means a menu screen in which a movie or the like recorded on the DVD 10 is divided into sections at predetermined intervals (such as by scenes in the story) and a list of still images or moving pictures representing the content of the sections is presented within one screen, such that a still image or the like corresponding to a desired section can be selected so that the story can start playback at that section. For typical DVDs, data for displaying such a chapter menu is prepared in advance.

Figure 5:
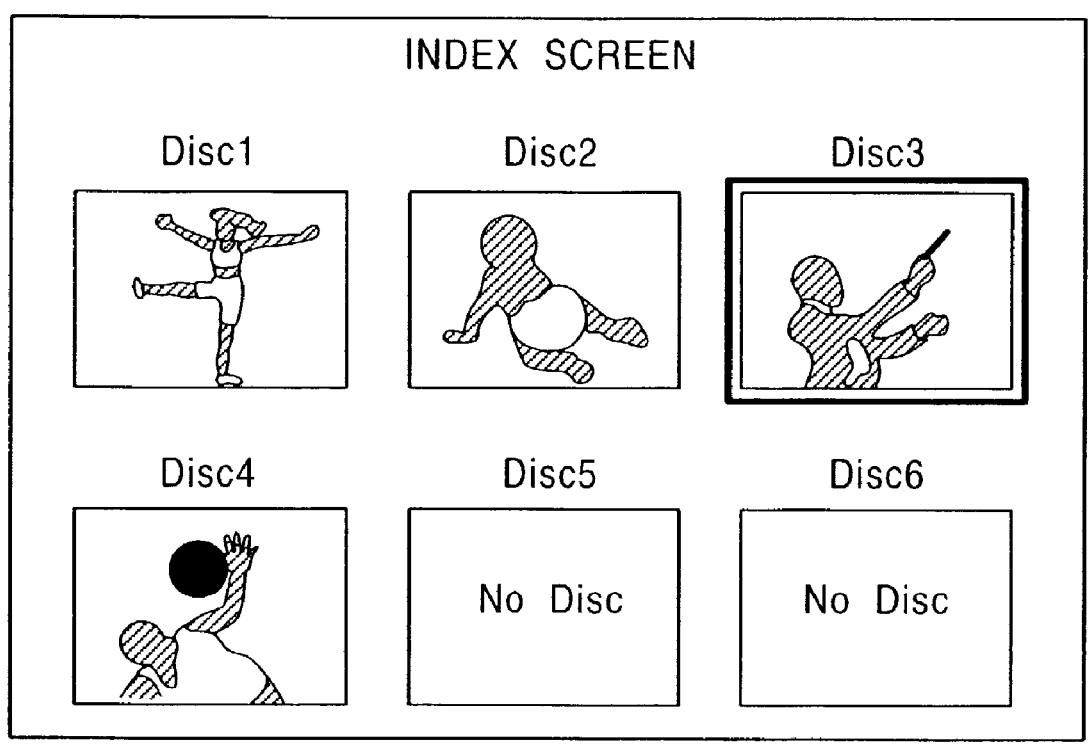
FIG. 5 illustrates an example display of an index screen which includes key images produced using thumbnail images contained in a chapter menu.

FIG. 5 is a representation of an example display of an index screen which includes key images produced using thumbnail images contained in chapter menus. In the index screen shown in FIG. 5, "Disc 1" to "Disc 4" include key images generated using thumbnail images contained in chapter menus recorded on the respective DVDs 10. For example, for "Disc 1," one of a plurality of thumbnail images contained in a chapter menu of the corresponding DVD 10, which shows a scene in which a person is dancing, is extracted. For "Disc 2," a thumbnail image showing a scene in which a baby is sitting back is extracted. For "Disc 3," a thumbnail image indicating a scene in which a conductor is conducting an orchestra is extracted. For "Disc 4," a thumbnail image for a scene zooming in on a player playing with a ball is extracted. "Disc 5" and "Disc 6" indicate that a DVD 10 is not loaded. Accordingly, use of a chapter menu including thumbnail images for some key scenes in a movie, etc., can also make it easy to generate key images which are included in an index screen.

The key images may be switched together by performing a predetermined switching operation using the operating unit 58. For example, in FIG. 5, if the key images displayed for "Disc 1" to "Disc 4" are thumbnail images identified as chapter No. 1 (the first selection) in the chapter menus of the respective DVDs 10, the switching operation is performed to switch the key images from the thumbnail images of chapter No. 1 to the thumbnail images of chapter No. 2 in the respective chapter menus. A chapter number may be specified using the numerical keys provided on the operating unit 58 by directly entering the number in order to update the key images.

The key image for "Disc 3" is highlighted in FIG. 5, indicating that this key image is temporarily selected as the candidate for the DVD 10 to be played back. A sound corresponding to the candidate key image is played back and produced when the chapter menu is played back. When one key image is specified, the DVD 10 corresponding to that key image starts playing back. The playback operation may start with the scene corresponding to the thumbnail image displayed as the key image, or may start from the beginning. If there is any restriction on the playback position for starting playback of the DVD 10, the DVD 10 must be played back according to this restriction, and may move to the scene corresponding to the thumbnail image displayed as the key image after this restriction is released.

In addition to DVDs, CDs (compact discs) having music etc. recorded thereon may be loaded in the disc changer 11, and key images related to content recorded on the CDs may also be generated and included in the index screen. Examples of key images related to content recorded on a CD include (1) an image of the jacket (the wrapper or cover including a key image or photo related to the content of the recording) provided with the CD, which is downloaded from a web site on the Internet, and (2) a content display image generated using text information recorded on the CD.

Figure 6:
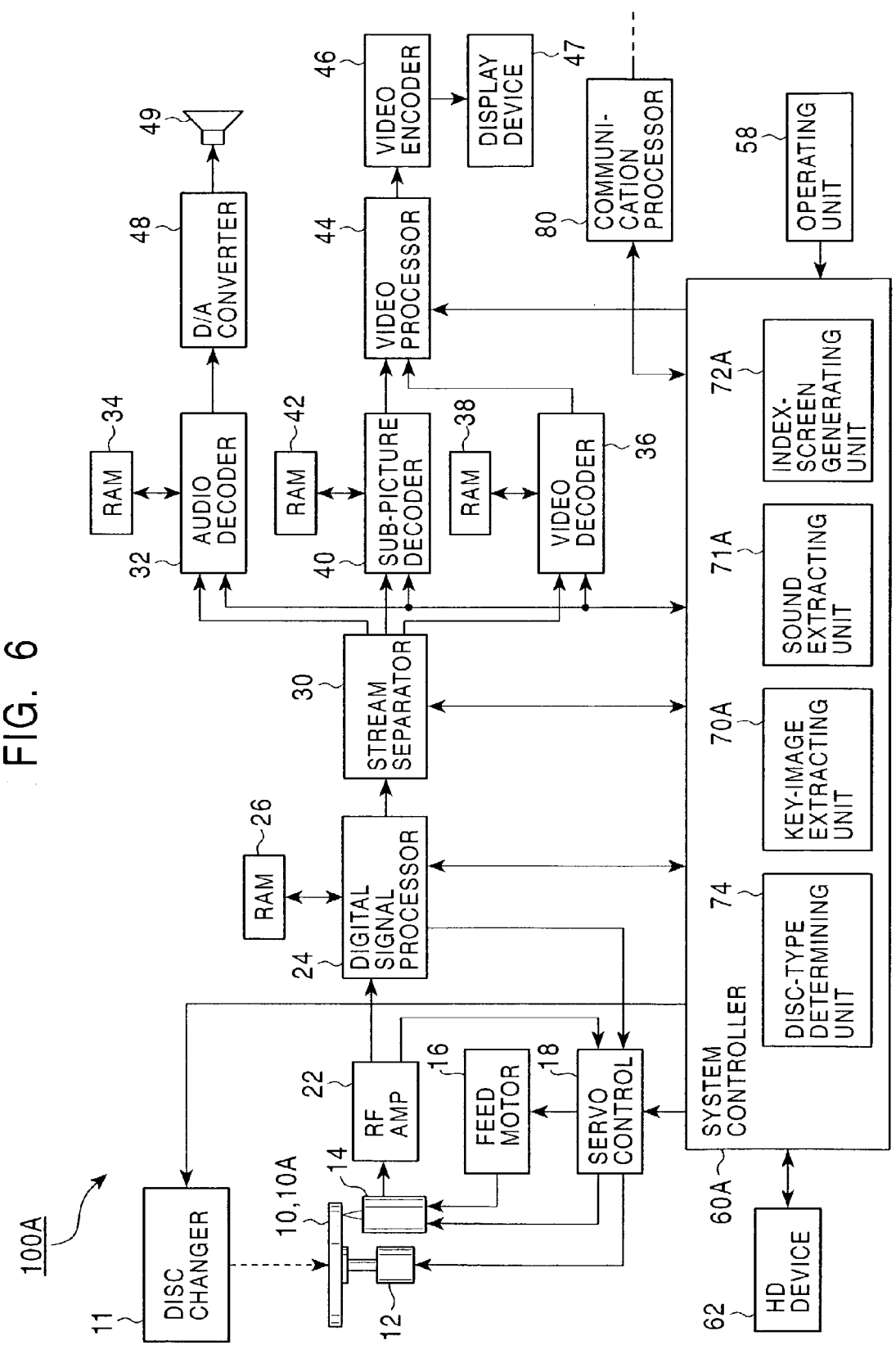
FIG. 6 is a block diagram of a modified disc playback apparatus capable of receiving a plurality of CDs having music or the like recorded thereon.

FIG. 6 is a block diagram of a modified disc playback apparatus 100A in which CDs each having music etc. recorded thereon can be loaded. Basically, the disc playback apparatus 100A shown in FIG. 6 has the same configuration as the disc playback apparatus 100 in the above-described embodiment, except that the system controller 60 is replaced with a system controller 60A having a different internal configuration, and that a communication processing unit 80 is added. The configuration of the disc playback apparatus 100A is now described, focusing on the points which differ from the disc playback apparatus 100.

The system controller 60A includes a key-image extracting unit 70A, a sound extracting unit 71A, an index-generating unit 72A, and a disc-type determining unit 74.

The key-image extracting unit 70A basically performs processing similar to that of the key-image extracting unit 70 in the disc playback apparatus 100 shown in FIG. 1. When a CD 10A is loaded in the disc changer 11, the key-image extracting unit 70A reads TOC (Table Of Contents) information recorded on the CD 10A, and accesses the Internet via the communication processing unit 80 to download a jacket image of the CD 10A from a predetermined web site (not shown) on the Internet based on the TOC information.

If the loaded CD 10A is a CD having video recorded thereon, such as a so-called video CD, the key-image extracting unit 70A extracts a menu screen or the like to generate a key image. If text information including content-related information (such as the titles of the recording and the name of the artist) is recorded on the loaded CD 10A, the key-image extracting unit 70A reads the text information, and uses it to generate a content display image indicating the recorded content of the CD 10A.

The sound extracting unit 71A basically performs processing similar to that of the sound extracting unit 71 in the disc playback apparatus 100 shown in FIG. 1. When a CD 10A is loaded in the disc changer 11, the sound extracting unit 71A extracts a sound recorded on the CD 10A. If the loaded CD 10A is a music CD, for example, about 10 seconds of sound is extracted from the beginning of the first recorded piece of music. If the loaded CD 10A is a video CD, for example, a sound corresponding to the menu screen is extracted.

The index-screen generating unit 72A basically performs processing similar to that of the index-screen generating unit 72 in the disc playback apparatus 100 shown in FIG. 1. When a CD 10A is loaded in the disc changer 11, the index-screen generating unit 72A generates an index screen using a key image, such as a jacket image or a content display image, for the CD 10A which is generated by the key-image extracting unit 70A and which is stored in the hard disk device 62.

The disc-type determining unit 74 determines the type (DVD or CD) of disc loaded in the disc changer 11.

The communication processing unit 80 performs communication necessary for the system controller 60A to transmit and receive data to and from a web site on the Internet.

The disc-type determining unit 74 serves as a disc determining unit, and the communication processing unit 80 serves as a communication unit.

The operation of the disc playback apparatus 100A shown in FIG. 6 is now described. The procedure for the disc playback apparatus 100A is basically the same as that of the disc playback apparatus 100 described above with reference to FIGS. 2 and 3, except for the following points.

In step 100, a disc (DVD 10 or CD 10A) is selected in place of the selection of a DVD from DVDs alone. In an additional step between steps 100 and 101, the disc-type determining unit 74 determines the type of the selected disc. If the disc-type determining unit 74 determines that the selected disc is a DVD, the processing in steps 101 and 102 is performed to generate a key image. If the selected disc is a CD, text information recorded on a CD 10A or a jacket image downloaded via the Internet is used to generate a key image. Then, the procedure proceeds to step 103.

Figure 7:
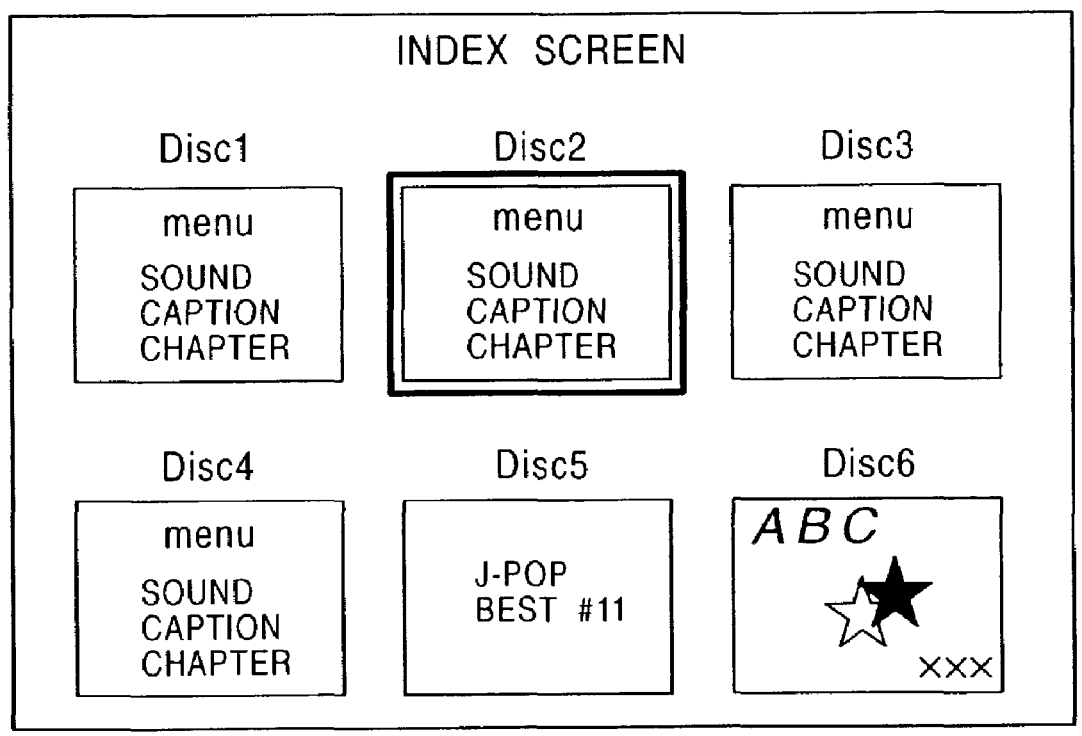
FIG. 7 illustrates an example display of an index screen which includes key images for a CD.

FIG. 7 is a representation of an example display of an index screen which includes key images for CDs. In the example display shown in FIG. 7, key images corresponding to content recorded on the DVDs 10 are presented for "Disc 1" to "Disc 4," as described above with reference to FIG. 4. For "Disc 5," a key image generated using text information recorded on a CD 10A is presented, in which a content display image containing the title of the recording ("J-POP Best #11") is shown. For "Disc 6," a key image generated using a jacket image downloaded via the Internet is presented, in which the jacket image of CD album "ABC" performed by artist "xxx" is shown.

Accordingly, even when both DVDs and CDs are loaded in the disc changer 11, a jacket image (key image) for a recording of a CD may be downloaded and used to generate and display an index screen including a key image indicating the recorded content of the CD. If text information is recorded on a CD, the text information may be used to generate a content display image which is included in the index screen, thus allowing a key image related to the recorded content of the CD to be displayed even when video is not recorded on the CD.

In the aforementioned embodiment, an index screen including a plurality of key images is generated and displayed. However, in another embodiment, only one of a plurality of key images may be displayed in the screen, and the key image to be displayed may be switched in response to a predetermined switching operation. This is advantageous in that each of the key images can be displayed in a magnified form.

In the aforementioned embodiment, key-image data corresponding to key images are stored in the hard disk device 62. However, any storage device other than a hard disk device, such as a large-capacity semiconductor memory, may be used for storage of key images.

The aforementioned embodiment has been discussed in the context of a read-only DVD or CD; however, the disc-type recording media according to the present invention are not limited to these types, and a variety of modifications may be made. For example, video etc. recorded on various data-rewritable disc recording media, such as DVD-RAM and CD-R, may be played back without departing from the scope and spirit of the invention. In particular, when a user records pieces of music, etc, on a CD-R or the like, the user may write to the CD-R or the like not only the pieces of music, etc., but also a jacket image downloaded from a web site on the Internet using his or her personal computer at home, and the written jacket image may be used to generate a key image for the CD. A DVD having music etc. recorded according to the DVD-Audio standard may be loaded for playback. In this case, a still image or menu screen recorded on the DVD together with audio according to the DVD-Audio standard may be used to generate a key image.

The invention claimed is:

1. A disc playback apparatus comprising:
    a disc changing mechanism in which a plurality of digital versatile discs can be loaded, each having video recorded thereon, for selecting one of the loaded digital versatile discs to set the selected digital versatile disc at a playback position;
    a playback unit for playing back the digital versatile disc set at the playback position by the disc changing mechanism;
    a key-image extracting unit for causing the playback unit to play back the plurality of digital versatile discs loaded in the disc changing mechanism, and for extracting a key image related to content recorded on each of the digital versatile discs, where the key image is a still image; and
    an index-screen generating and displaying unit for generating and displaying an index screen, the index screen including within one screen the key images corresponding to at least one of the plurality of digital versatile discs;
    wherein the index-screen generating and displaying unit displays, as a candidate, a key image specified by a user in a highlighted fashion relative to the other key images by causing the outline of the specified key image to be highlighted relative to the other key images, the disc playback apparatus further comprising an audio output unit for playing back and producing a sound corresponding to the candidate key image when the candidate key image is specified.

2. A disc playback apparatus according to claim 1, wherein the key image comprises a thumbnail image obtained by reducing a menu screen of a digital versatile disc.

3. A disc playback apparatus according to claim 1, wherein the key image comprises a thumbnail image contained in a chapter menu of a digital versatile disc.

4. A disc playback apparatus according to claim 1, further comprising a storage device for storing key-image data corresponding to the key images extracted by the key-image extracting unit,
wherein the index-screen generating and displaying unit generates the index screen by reading the key-image data stored in the storage device.

5. A disc playback apparatus comprising:
a disc changing mechanism in which at least one compact disc can be loaded in addition to a plurality of digital versatile discs each having video recorded thereon, for selecting one of the loaded discs to set the selected disc at a playback position;
a playback unit for playing back the disc set at the playback position by the disc changing mechanism;
a disc determining unit for determining the type of the discs loaded in the disc changing mechanism;
a key-image extracting unit for, when the disc whose type is determined by the disc determining unit is a digital versatile disc, extracting a key image related to content recorded on the digital versatile disc where the key image is a still image;
a communication unit for, when the disc whose type is determined by the disc determining unit is a compact disc, obtaining a key image related to the compact disc via a predetermined communication line based on content table information contained in the compact disc; and
an index-screen generating and displaying unit for generating and displaying an index screen, the index screen including within one screen the key images corresponding to at least one of the digital versatile discs and/or the key image corresponding to the compact disc;
wherein the index-screen generating and displaying unit displays, as a candidate, a key image specified by a user in a highlighted fashion relative to the other key images by causing the outline of the specified key image to be highlighted relative to the other key images, the disc playback apparatus further comprising an audio output unit for playing back and producing a sound corresponding to the candidate key image when the candidate key image is specified.

6. A disc playback apparatus according to claim 5, wherein the key image for each of the digital versatile discs comprises a thumbnail image obtained by reducing a menu screen of the digital versatile disc, and the key image for the compact disc comprises a thumbnail image obtained by reducing an image depicted on a jacket of the compact disc.

7. A disc playback apparatus according to claim 5, wherein the key image for each of the digital versatile discs comprises a thumbnail image contained in a chapter menu of the digital versatile disc, and the key image for the compact disc comprises a thumbnail image obtained by reducing an image depicted on a jacket of the compact disc.

8. A disc playback apparatus according to claim 5, wherein, when the disc whose type is determined by the disc determining unit is a compact disc, and video is not recorded on the compact disc, the index-screen generating and displaying unit generates a content display image formed of text information recorded on the compact disc, and the content display image is contained in the index screen.

9. A disc playback method comprising:
playing back a plurality of digital versatile discs loaded in a disc changing mechanism;
extracting a key image related to content recorded on each of the digital versatile discs, where the key image is a still image; and
displaying at least one of the extracted key images on one screen as an index screen;
wherein a key image specified by a user from the one screen is displayed in a highlighted fashion relative to other key images displayed on the screen by causing the outline of the specified key image to be highlighted relative to the other key images, and a sound corresponding to the specified key image is produced when the key image is specified.

10. A disc playback method according to claim 9, wherein more than one of the extracted key images are displayed on one screen as an index screen.

11. A disc playback method according to claim 9, wherein the key image is a single thumbnail image contained in a chapter menu of the digital versatile disc, and the method further comprises responding to a predetermined switching operation by switching a key image from one thumbnail image contained in the chapter menu to another thumbnail image contained in the chapter menu.

12. A disc playback method according to claim 9, wherein the key image comprises a thumbnail image obtained by reducing a menu screen of a digital versatile disc.

13. A disc playback method according to claim 9, wherein at least one compact disc can be loaded in the disc changing mechanism in addition to the plurality of digital versatile discs, and the method further comprises determining the type of the discs loaded in the disc changing mechanism and, when a disc is determined to be a compact disc, obtaining a key image related to the compact disc via a predetermined communication line.

14. A disc playback method according to claim 13, wherein the key image for the compact disc comprises a thumbnail image obtained by reducing an image depicted on a jacket of the compact disc.

15. A disc playback method according to claim 13, wherein the key image for the compact disc comprises text information recorded on the compact disc.

* * * * *